UNITED STATES PATENT OFFICE.

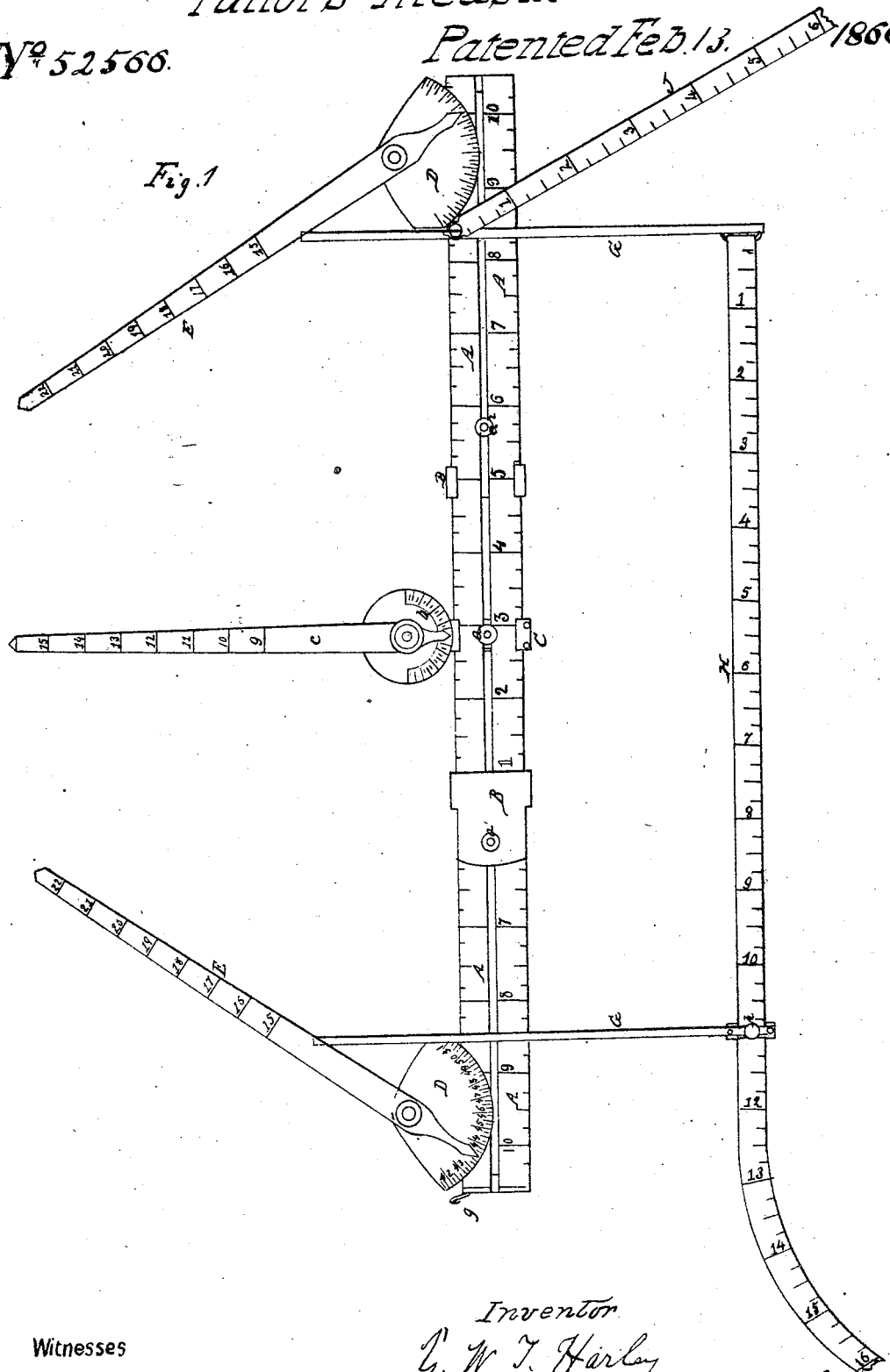

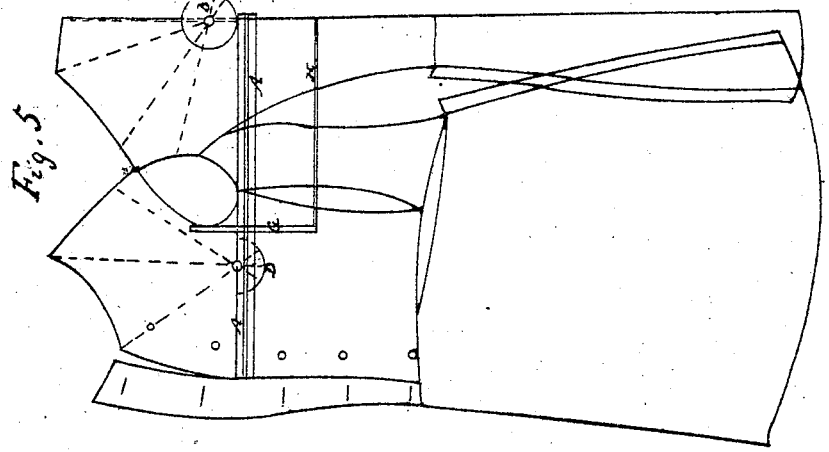
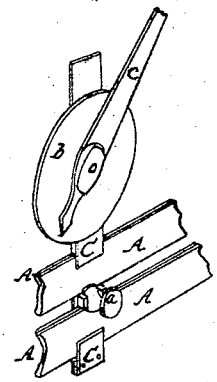
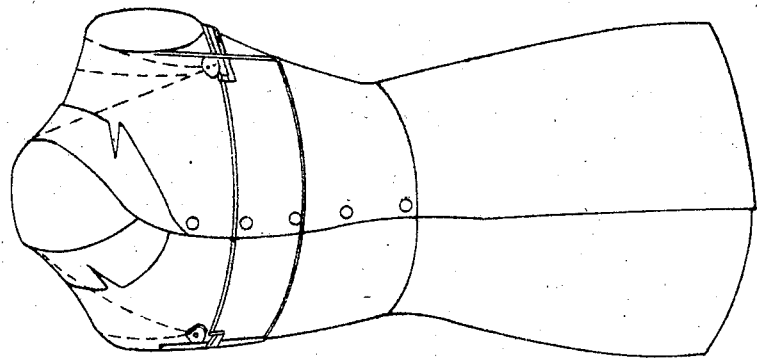
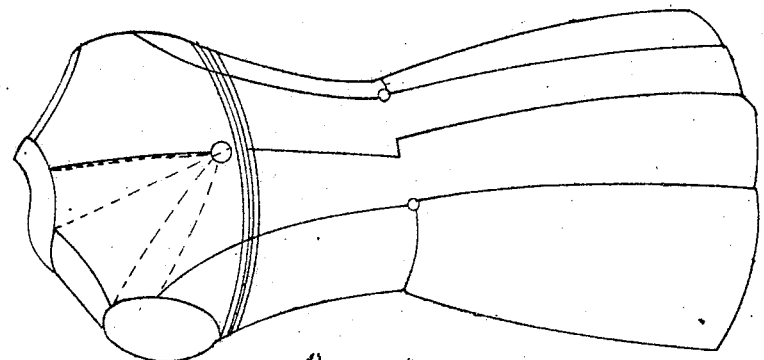

GEORGE W. T. HARLEY, OF FREDERICK, MARYLAND.

IMPROVEMENT IN TAILORS' MEASURES.

Specification forming part of Letters Patent No. 52,566, dated February 13, 1866.

*To all whom it may concern:*

Be it known that I, GEORGE W. T. HARLEY, of Frederick, in the county of Frederick and State of Maryland, have invented a new and Improved Tailor's Measure; and I do hereby declare that the following is a full, clear, and exact description thereof, reference being had to the accompanying drawings, making a part of this specification, in which—

Figure 1 is a view of my improved measuring device complete. Fig. 2 is a perspective view of the central adjustable back-plate through which the metallic straps pass. Fig. 3 is a view representing the device applied to the back of the person. Fig. 4 shows that part of the device which is applied to the front of the person. Fig. 5 shows the method of cutting according to the measurements which are determined by the improved measuring device.

Similar letters of reference indicate corresponding parts in the several figures.

The first part of my invention consists in determining the front and bottom parts of the "scye" or armhole by a horizontal and perpendicular scale, which is susceptible of adjustment for persons of different sizes. This gives me the points from which to establish the different measures, and enables me to readily find the center of the back without the necessity of any calculation, as will be hereinafter described.

It also consists in an adjustable slide, in combination with an extensible graduated scale, for determining the central point between the two scyes, and for fixing this point preparatory to the taking of other measures, thus determining the center of the back, said slide being provided with a protractor and also with a pivoted blade or strap, which is graduated into inches and fractions of inches, for finding distances and angles correctly from the center of the back to prominent points on the shoulder, as will be hereinafter described.

It also consists in applying a protractor having a graduated strap pivoted to it to both extremities of the horizontal extensible scale, for the purpose of finding distances and angles from a point which is in front of the scye to certain points on the shoulder, as will be hereinafter described.

To enable others skilled in the art to understand my invention, I will describe its construction and operation.

In the accompanying drawings, A A represent narrow metallic straps, which are united together at their extremities in pairs, so as to leave spaces between them for the reception of the necks of set-screws $a$ $a'$ $a^2$, which are used for securing the two pairs of straps together when properly adjusted.

The inner ends of the straps A A are connected rigidly to sliding clasps B B, one of which is arranged on one side of the straps A and the other on the opposite side thereof, as shown in Fig. 1.

The intermediate sliding clasp, C, has a protractor, $b$, secured to it, which is properly graduated and provided with a graduated scale-blade, $c$, that is pivoted to the center of the plate $b$. This slide C embraces both straps, and may be rigidly secured to both by means of the set-screw $a$, the neck of which passes between the straps, as shown in Fig 2.

When the set-screw $a$ is loosened the slide C can be moved in a direction with the length of the straps A A and fixed at an equal distance from both slides B B, thus establishing the center of the back.

The pieces A A should be properly graduated in inches and fractions of inches, so that the protractor-slide can be adjusted and set without calculation.

At or near the outer ends of the extensible straps A A segmental protractors D D are rigidly secured, which are properly graduated and provided with pivoted straps E E, which are properly graduated in inches and fractions of inches. Like the pivoted blade $c$, the blades E E will indicate upon their protractors the angles at which they are adjusted and also the distances from their respective pivots.

G G are two rods, which are secured to the respective strips A A near the protractors D D, as shown in Fig. 1. To the lower end of one of these rods G is a tape, H, having inches and fractions of inches marked upon it. The opposite end of this tape-measure is passed through a loop on the lower end of the opposite rod G, and may be secured to this rod by a set-screw, $h$. (Shown in Fig. 1.)

J is a graduated tape-measure, which is connected near one end of the sliding straps A A, and which is passed across the front part of the body, as shown in Fig. 4, and attached, by a hook, g, or otherwise, to the opposite end of the extensible straps A.

The rods G G may have hooks attached to them for securing the instrument to the person preparatory to taking the measures.

The instrument is applied to the person, as indicated in Figs. 3 and 4, the perpendicular rods G G being adjusted against the front part of the scye or shoulder. The instrument is then secured in place by means of the two straps or tape-measures H J passing across the front part of the person. The central protractor, b, is now adjusted so as to be at equal distance from the two sliding connections B B and secured by means of the set-screw a, thus giving the center of the back. The measurements for the back are now taken by means of the graduated blade c, by adjusting which the distance (and the angle) from the center of the back to the upper point of the shoulder-seam or neck-gorge is determined. The distance (and angle) from the center of the back to the most prominent point of the shoulder-bone is also found, and the distance from center of back to the neck-bone is found.

The front blades, E, are used for the purpose of finding the distance and determining the angle from a point which is in front of the scye to the upper point of the shoulder-seam or neck-gorge; also for finding the distance from the same point to the most prominent part of the shoulder-bone; also from the same point to the front of the neck-gorge.

The long tape-measure H extends from the lower end of one rod G to the lower end of the opposite rod G, and is drawn properly tight for the purpose of keeping these bars properly in position, and also to find the amount of cloth to be taken out of the back to make the coat fit tight.

The short tape-measure J may be used for finding the width required for the back. This is done by holding this tape at the shoulder-bone and bringing the pivoted scale or blade of the back to intersect with said tape. The point of intersection gives half the width of back required.

Other measures which I have not mentioned, and which will readily suggest themselves to a tailor, may be made by means of the instrument herein described.

The controlling part of my invention consists in the extensible straps A A, the perpendicular rods G G, and the device for finding the center of the back, by which arrangement I have the foundation for finding any measure required.

Having thus described my invention, what I claim as new, and desire to secure by Letters Patent, is—

1. The combination of the graduated extensible straps A A with the slides B B, and the intermediate sliding protractor, b, and pivoted scale-blade c, with the perpendicular rods G G, substantially as described.

2. The combination of the adjustable blades E E and protractor-plates D D with the central protractor-plate, b, and blade and the extensible graduated straps A A, substantially as described.

3. The long tape-measure H, in combination with the perpendicular rods G G and the extensible straps A A, substantially as described.

4. The short tape-measure J, in combination with the extensible straps A A and perpendicular rods G G, substantially as described.

Witness my hand in the matter of my application for a patent for a new tailors' measure.

GEO. W. T. HARLEY.

Witnesses:
R. T. CAMPBELL,
EDW. SCHAFER.